United States Patent

Omura

Patent Number: 5,218,558
Date of Patent: Jun. 8, 1993

[54] OUTPUT CIRCUIT OF A CHARGE-COUPLED DEVICE

[75] Inventor: Katsuyuki Omura, Yokohama, Japan

[73] Assignee: Ricoh Company, Ltd., Tokyo, Japan

[21] Appl. No.: 611,068

[22] Filed: Nov. 8, 1990

[30] Foreign Application Priority Data

Nov. 10, 1989 [JP] Japan .................... 1-293133
Feb. 28, 1990 [JP] Japan .................... 2-45675
Feb. 28, 1990 [JP] Japan .................... 2-45676

[51] Int. Cl.⁵ .................. G06J 1/00; G06F 15/332
[52] U.S. Cl. ........................ 364/604; 364/726; 364/727
[58] Field of Search ............ 364/604, 727, 825, 826, 364/726; 365/206; 354/25

[56] References Cited

U.S. PATENT DOCUMENTS

| | | | |
|---|---|---|---|
| 3,925,646 | 12/1975 | Richardson et al. | 364/727 |
| 4,038,539 | 7/1977 | Van Cleave | 364/727 |
| 4,133,606 | 1/1979 | Hosoe et al. | 354/25 |
| 4,330,753 | 5/1982 | Davy | 365/206 |

FOREIGN PATENT DOCUMENTS 59-226520 12/1984 Japan .................... 364/727

*Primary Examiner*—Jerry Smith
*Assistant Examiner*—Steven R. Garland
*Attorney, Agent, or Firm*—Oblon, Spivak, McClelland, Maier & Neustadt

[57] ABSTRACT

A detection system for detecting information using a charge-coupled device comprises a charge-coupled device supplied with a clock pulse having a predetermined frequency and producing an output signal pulse, a memory device for storing a set of orthogonal functions, and a processing unit supplied with the output signal pulse from the charge-coupled device sequentially in response to the clock pulse and further for reading out the orthogonal functions stored in the memory device, wherein the processing unit expands each output signal pulse of the charge-coupled device into an orthogonal series using the orthogonal functions as a base of expansion, and extracts a term in the orthogonal series that corresponds to the signal component representing the information detected by the charge-coupled device as an output signal.

10 Claims, 9 Drawing Sheets

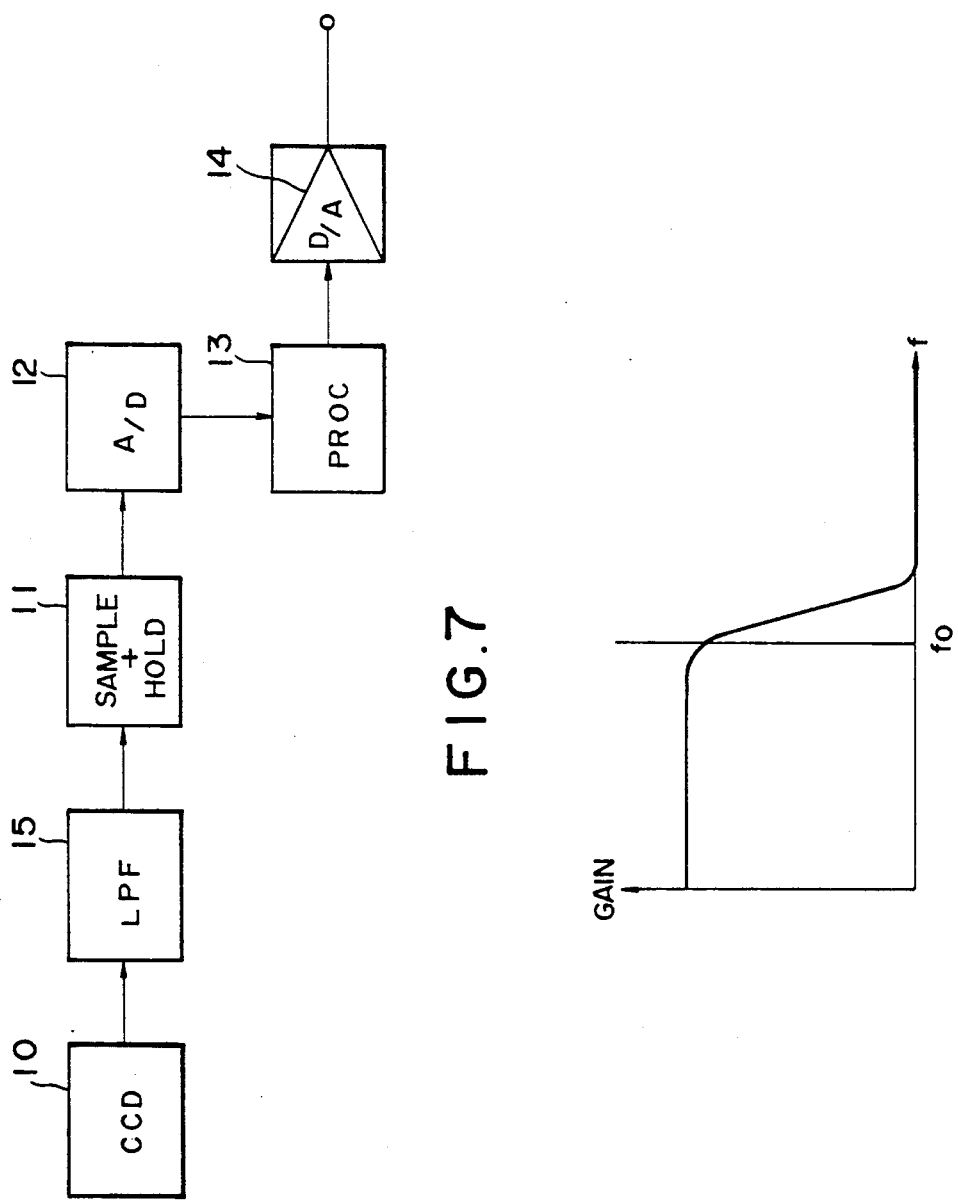

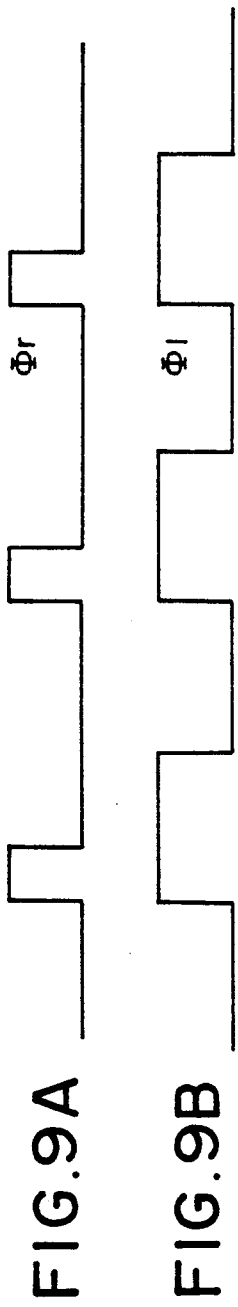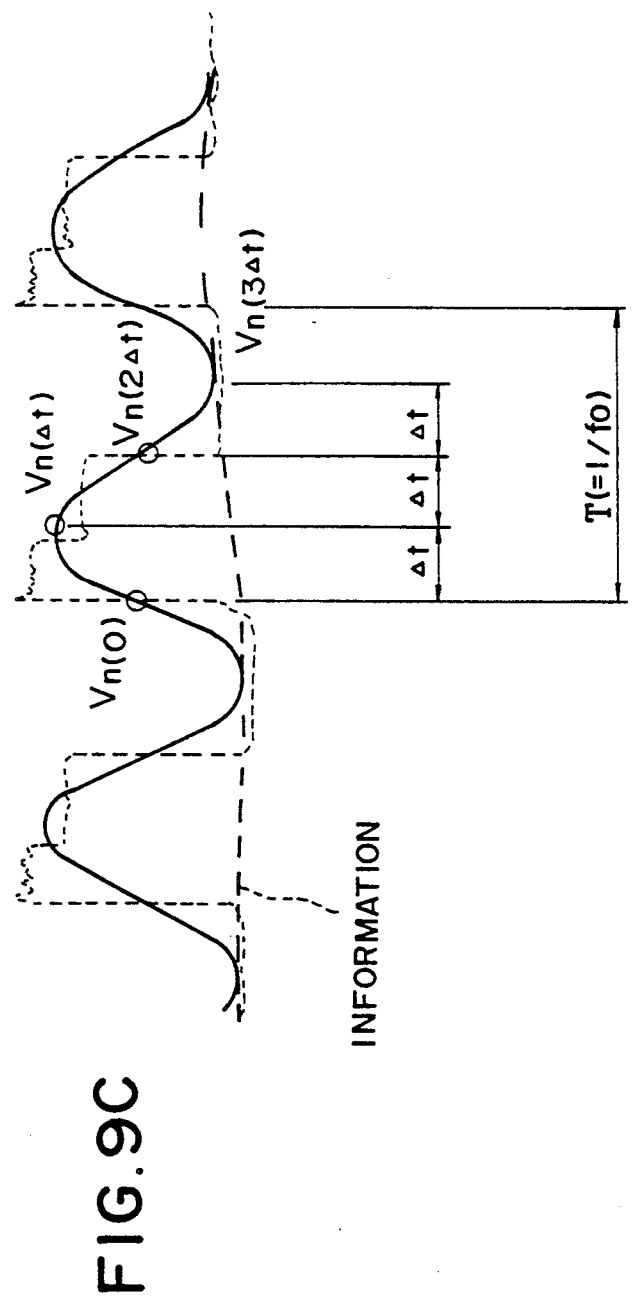

OUTPUT CIRCUIT OF A CHARGE-COUPLED DEVICE

BACKGROUND OF THE INVENTION

The present invention generally relates to so-called charge-coupled devices and more particularly to a process and circuit for eliminating noise from the output of a charge coupled device.

FIG. 1 shows a typical conventional charge-coupled device (CCD) 10 and an output circuit cooperating therewith. Referring to FIG. 1, there is provided a CCD transfer channel 1 for transferring electric charges formed by individual CCD active elements not illustrated, a buffer circuit 2 for detecting the transfer of electric charges and for producing an output voltage in response thereto, and a reset transistor for resetting the buffer circuit 2. The buffer circuit 2 detects the transferred electric charges by detecting the voltage appearing at a diode 5 that is provided at an end of the channel 1 for collecting the transferred electric charges. More specifically, in correspondence to the transfer channel 1, there are provided a number of transfer electrodes 4 of the CCD active elements, and the electric charges produced by the CCD active elements are transferred from one element to another in response to application of transfer clocks $\phi 1$ and $\phi 2$ that have respective phases shifted from each other. Thus, in response to every one period of the transfer clock $\phi 1$, the electric charges flow into the diode 5 and causes a change in the voltage at the diode 5 that in turn is detected by the buffer circuit 2.

In the circuit of FIG. 1, there is provided a reset transistor 6 between the diode 5 and the buffer circuit 2 for resetting the voltage produced at the diode 5. The transistor 6 has a gate electrode 6 that is supplied with a reset pulse $\phi r$ with a period identical to the period of the transfer clocks $\phi 1$ and $\phi 2$. Thus, when the transistor 6 is turned on in response to the reset pulse $\phi r$, the output voltage of the diode 5, i.e., the input signal to the buffer circuit 2 is reset.

FIGS. 2(A)–(C) are waveform diagrams for explaining the operation of the circuit of FIG. 1, wherein FIG. 2(A) shows the reset pulse $\phi r$, FIG. 2(B) shows the transfer clock $\phi 1$, and FIG. 2(C) shows the waveform of output of the diode 5.

Referring to the drawings, the voltage appearing at the diode 5 is forcedly increased to the level of +V volt that is the drain voltage of the reset transistor 6 in an interval between a time t0 and a time t1 during which the transistor 3 is turned on. In this interval, it should be noted that the reset pulse $\phi r$ is set to have a high level state. Next, the transistor 3 is turned off at the time t1, and in response thereto, the voltage appearing at the diode 5 is set at a predetermined, reference voltage level Vo that is determined by a capacitance 7 and a gate-source capacitance of the reset transistor 3. Here, the capacitance 7 is formed by the capacitance of the diode 5 and the gate-source capacitance of the buffer circuit 2. Next, at a time t3, the electric charges are caused to flow into the diode 5 and the voltage at the diode 5 is changed from the foregoing level Vo to an output voltage level Vs. This voltage level Vs represents the output of the CCD active element and is outputted after amplification in the buffer circuit 2 as an output voltage of the CCD device 10. Thus, in response to the repetition of the transfer clocks $\phi 1$ and $\phi 2$, the output voltage Vs corresponding to the electric charges produced by the CCD elements are outputted one after another with the reset interval interposed therebetween.

In this conventional construction, there is a problem in that the transistor 3 generates a noise En during the interval in which it is turned on. Thereby, there arises a chance that the noise En modifies the voltage level Vo in a magnitude of ±Vn, where Vn represents the reset noise caused by the noise En. When such a modulation or fluctuation of the reference voltage level Vo occurs, the signal-to-noise ratio of the output signal Vs is inevitably deteriorated.

Further, such a source of the noise is not limited to the reset transistor. The buffer circuit 2 also contributes to the formation of the noise that causes the fluctuation of the reference voltage level Vo. The noise that is produced by the buffer circuit 2 has an amplitude generally proportional to the inverse frequency and is known as the 1/f noise.

In order to eliminate or minimize such reset noise and 1/f noise signals, a technique of so-called "double cross-correlational sampling" is proposed according to the Japanese laid-open patent application No. 56-116374, wherein the reference voltage level Vo is clamped, at a time t2 that is later than the time t1 but earlier than the time t3, and the output voltage Vs is obtained by sampling at a time t4 that is later than the time t3. Further, there is a proposal according to the Japanese laid-open patent application No. 62-208375 wherein the output signal of the CCD device is passed through a bandpass filter having a central frequency that coincides to the transfer clock frequency and apply a synchronous demodulation thereto in synchronization with the transfer clocks. According to this latter approach, the noise is reduced in the frequency range that corresponds to the pass-band of the bandpass filter, and thereby an improvement of the signal-to-noise ratio is achieved.

However, the double cross-correlational sampling is effective only for the reset noise signals and the low frequency component of the 1/f noise signals. Further, this approach cannot prevent the reference voltage level Vo that is clamped during the interval between t0 and t1 or the signal voltage Vs from being affected by the random noise that has no correlation. Such random noise signals are formed from the high frequency components of the 1/f noise signals. Further, there occurs other high frequency noise such as ringing noise that is produced when the CCD device is driven at a high speed. Thus, the approach of the double cross-correlational sampling cannot provide a satisfactory solution to the problem of the noise in the output of the CCD devices.

On the other hand, in the case of the synchronous demodulation, there is a problem in that the precise synchronous demodulation is difficult to achieve when the signal waveform of the output of the CCD device is deviated from the sine function significantly. Such a deviation makes it difficult to achieve synchronization. Further, this approach suppresses the low frequency component of the output signal of the CCD device that changes gradually with correlation between picture elements. This problem becomes particularly acute when image signals having gradation is processed. Because of the cut off of the low frequency component, the gradation of the original image cannot be reproduced satisfactorily.

Further, in the case where a sample and hold circuit is employed for processing the output of the CCD device, there arises a problem that a very stringent response is requested for the processing circuit because of the steep leading edge nature of the output waveform of the CCD devices.

SUMMARY OF THE INVENTION

Accordingly, it is a general object of the present invention to provide a novel and useful process and circuit for processing output of a CCD device, wherein the aforementioned problem is eliminated.

Another and more specific object of the present invention is to provide a process and circuit for detecting an output signal of a CCD device wherein the reset noise and high frequency noise components are eliminated from the output signal while maintaining the gradation of the image.

Another object of the present invention is to provide a process for detecting an output signal of a CCD device wherein a less stringent requirement is imposed for the frequency characteristic of the detection circuit used for detecting the output signal of the CCD device.

Another object of the present invention is to provide a detection circuit for detecting an output signal of a CCD device, comprising: a CCD device supplied with a clock pulse having a predetermined frequency for producing an output signal pulse in response thereto, said output signal pulse having a frequency identical to the frequency of the clock pulse and comprising a first amplitude portion corresponding to electric charges that are produced by the CCD device and a second amplitude portion corresponding to a reference voltage level; analog-to-digital conversion means supplied with the output signal pulse for producing digital data corresponding to the output signal pulse; and digital processing means supplied with the digital data from the analog-to-digital converter, said digital processing means having a memory part for storing a set of orthogonal functions each having a frequency that is an integer multiple of the frequency of the clock, said orthogonal functions being chosen such that any orthogonal function in the set produces a zero inner product with other orthogonal function in the set, said digital processing means expanding the output signal of the CCD device into an orthogonal series using the orthogonal functions as the base of expansion, said orthogonal series including a number of terms, wherein said operational means produces an output signal as a lower order term of the expansion. According to the present invention, not only the reset noise and the random noise but also other high frequency noise components are effectively eliminated from the output of the operational means and an excellent signal-to-noise ratio can be achieved. Thereby, a high quality output is achieved. It should be noted that the present invention is effective in eliminating the low frequency noise components that have a frequency lower than the frequency of the clock. On the other hand, the signal components that have a correlation between adjacent picture elements are unaffected even when the frequency of the signal component is lower than the frequency of the clock. This is because the expansion of the output signal of the CCD device into the orthogonal series is made for each interval of the clock signal, i.e. for each picture element. Thus, the frequency components that have a correlation over a number of picture elements is not affected by the present process. Further, one may choose any suitable orthogonal function system such as the triangular function, Walsh function, and the like, depending on the waveform of the output of the CCD device.

Other objects and further features of the present invention will become apparent from the following detailed description when read in conjunction with attached drawings.

BRIEF DESCRIPTION OF THE DRAWINGS

FIG. 7 is a block diagram showing a second embodiment of the present invention;

FIG. 8 is a diagram showing a characteristic of the filter used in the second embodiment; and FIGS. 9A-C are waveform diagrams for explanation of the second embodiment;

DETAILED DESCRIPTION

Figure 3:
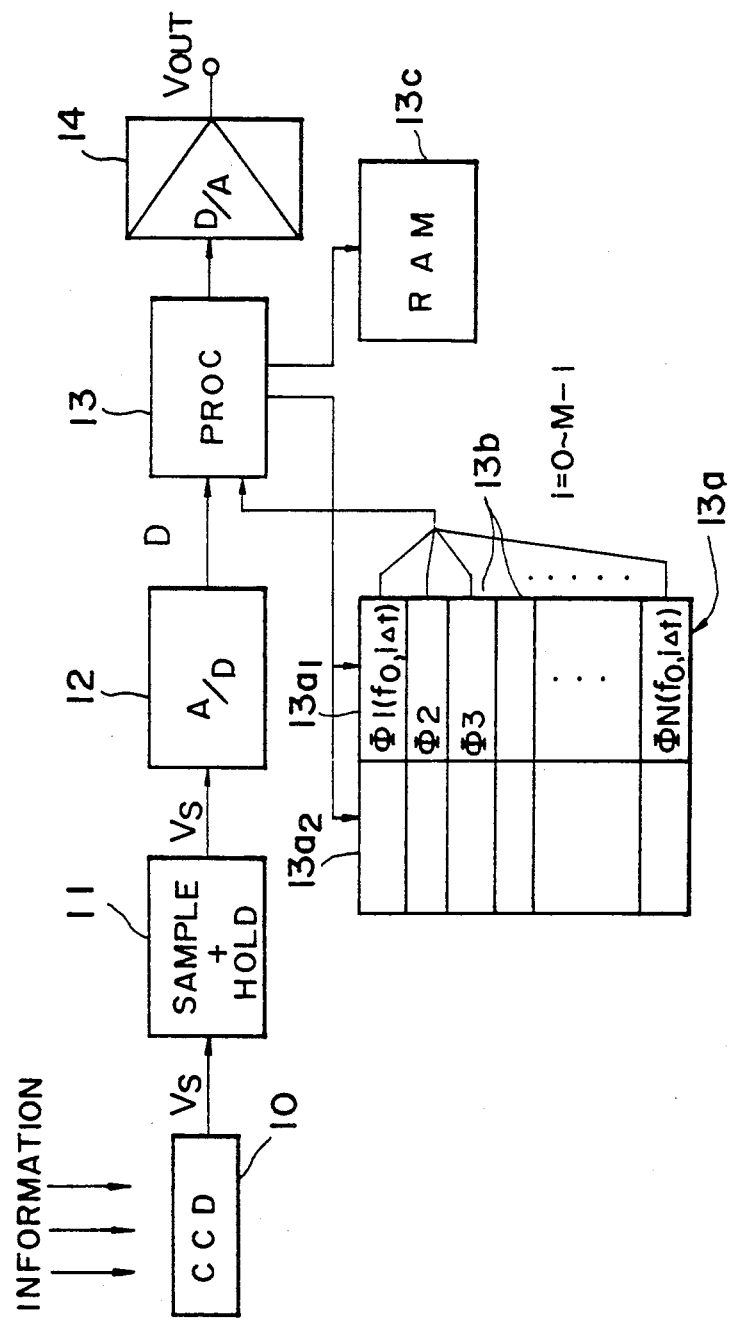
FIG. 3 is a block diagram showing the construction of the detection circuit according to an embodiment of the present invention.

FIG. 3 shows the block diagram of the detection circuit according to a first embodiment of the present invention.

Figure 1:
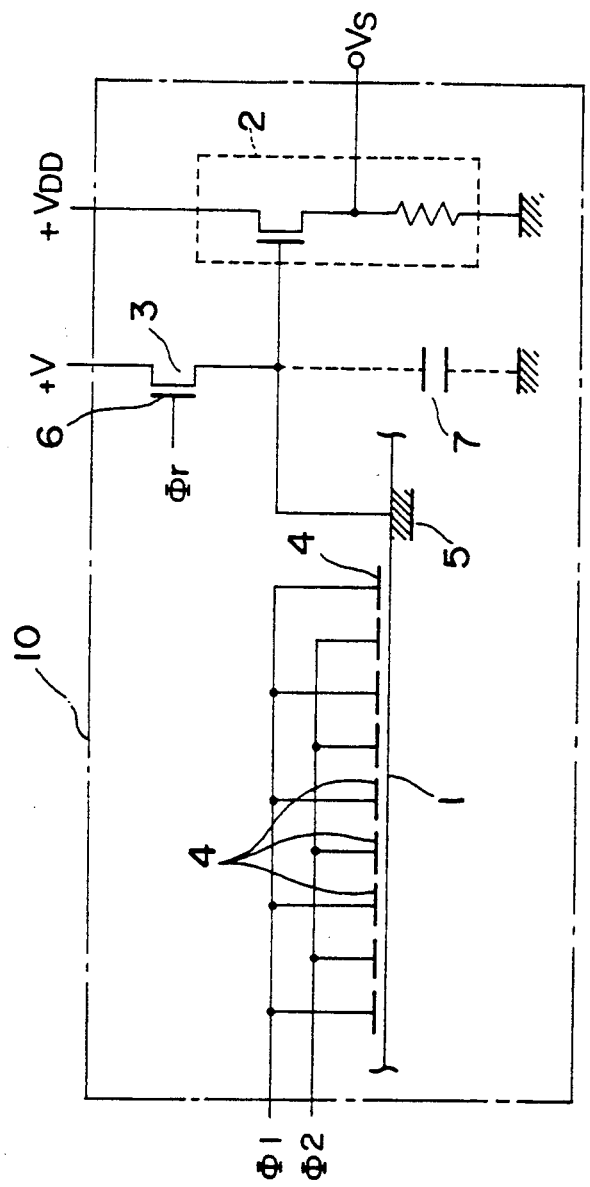
FIG. 1 is a schematical circuit diagram showing a conventional detection circuit used for detecting the output of a CCD device.
Figure 2:
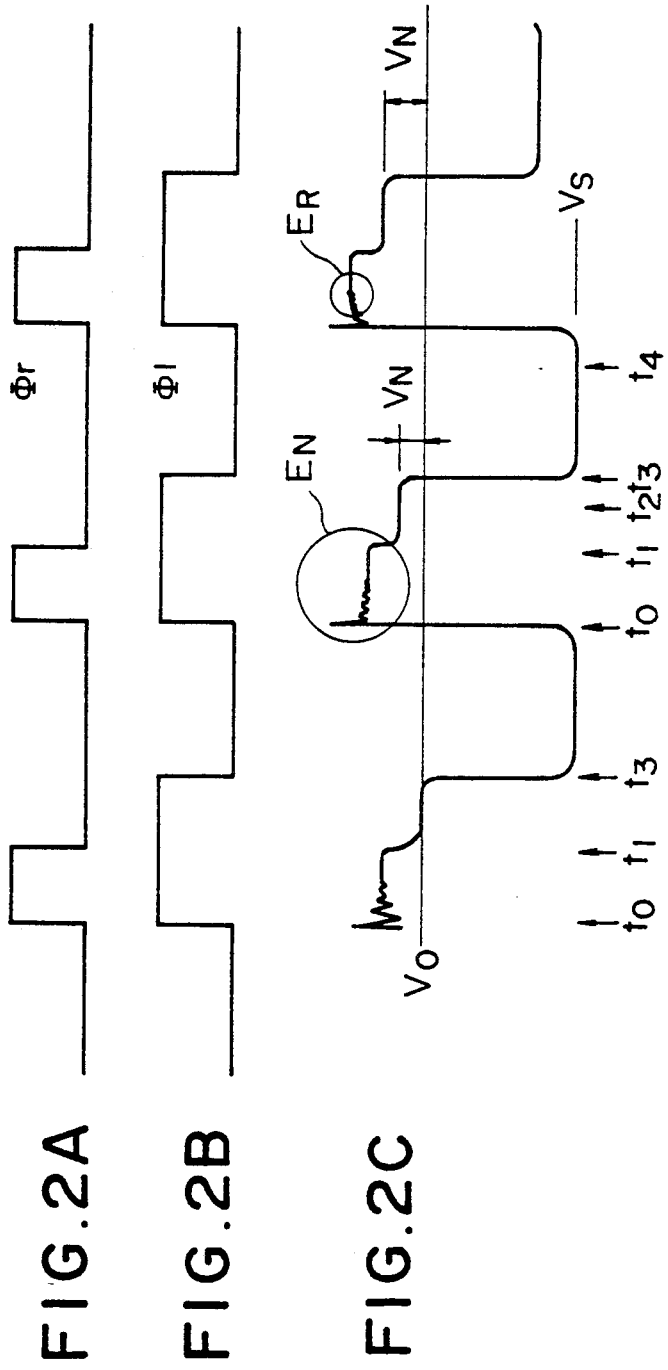
FIGS. 2A-2C are waveform diagrams showing various waveforms appearing in the circuit of FIG. 1.

Referring to FIG. 3, the detection circuit comprises a charge-coupled device 10 that is identical to the charge coupled device shown in FIG. 1. Thus, the charge-coupled device 10 is irradiated by an optical beam carrying information and produces an output signal in response thereto. As already noted, noise components are usually added to the output signal. Further, there is provided a sample and hold circuit 11 for sampling the output signal Vs of the charge-coupled device 10, and an analog-to-digital (A/D) converter 12 is provided for converting the sampled output signal of the device 10 into digital data D representing the magnitude of the amplitude of the signal Vs.

The output data D is supplied to a processing unit 13 that applies an operation to the output data D such that only the signal component corresponding to the electric charges formed by the CCD device is extracted. In order to carry out the above mentioned operation, there is provided a read-only memory (ROM) 13a in which a set of orthogonal functions $\phi 1$, $\phi 2$, $\phi 3$, ... are stored in respective memory areas 13b. There may be a plurality of memory fields $13a_1$, $13a_2$, ... in the ROM 13a for storing different set of orthogonal function. In this case, each memory field is divided into a number of memory areas 13b. The extracted output signal of the charge-coupled device 10 is further converted into an analog signal by a digital-to-analog converter 14 and outputted from an output terminal 15 as an output signal Vout. As will be described later, the processing unit 13 controls the ROM 13a to read out the set of orthogonal functions that suite the best for the intended processing. It should be noted that the ROM 13a may store a number of sets of orthogonal functions using the plurality of memory field $13a_1, 13a_2, \ldots$ Further, there is provided a random access memory (RAM) 13c in cooperation with the processing unit 13 for temporarily storing various data produced during the processing as well as for storing the result of processing.

Figures 4A, 4B, 4C:
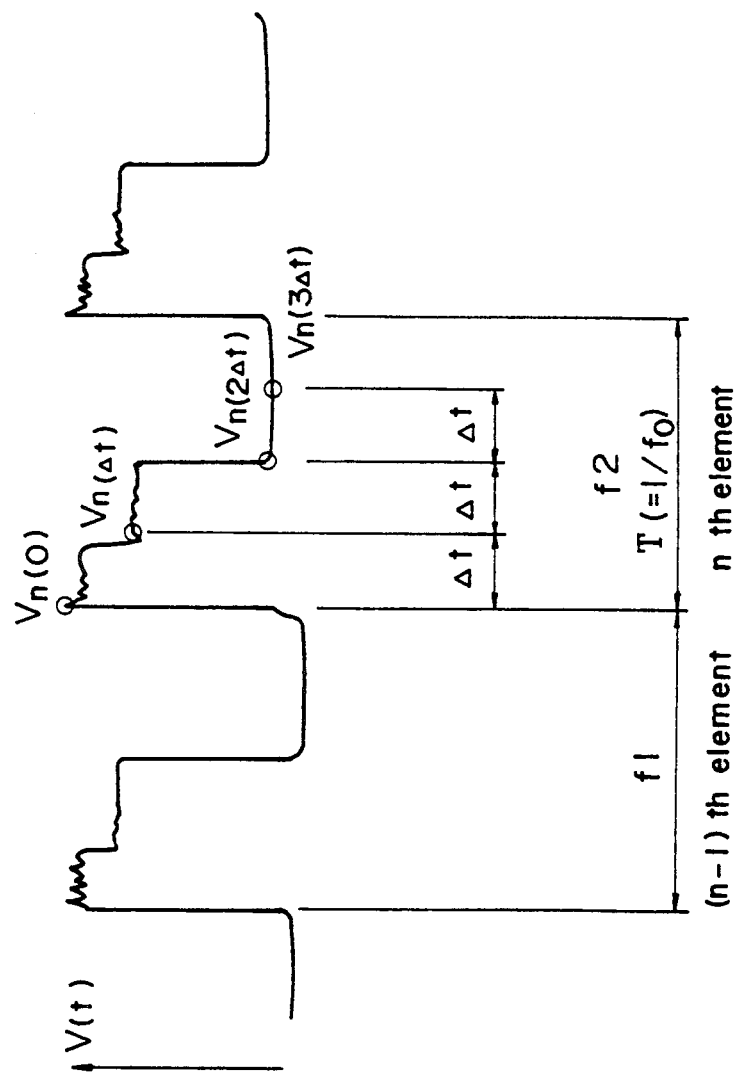
FIGS. 4A-4C are waveform diagrams showing the timing of sampling of the output of a CCD device employed in the detector of FIG. 3 together with the timing of the reset clock and the transfer clock.

Next, the principle of the circuit of FIG. 3 will be described with reference to the waveform chart of FIGS. 4A–4C showing the output waveform of the CCD device 10 and the timing of sampling.

Referring to the drawings, the output of the CCD device 10 is transferred to the diode 5 (see FIG. 1) in response to the transfer clock shown in FIG. 4B. In response to the transfer clock, the waveform shown in FIG. 4C is obtained for the output signal Vs wherein the signal Vs has a fundamental frequency fo that is identical to the frequency of the transfer clock. As will be understood from the principle of the CCD device, each field f1, f2, ... in FIG. 4C represents the output of different CCD elements forming the CCD device 10. In the device 10, it is assumed that there are N such CCD elements and thus N fields.

Under such a situation, the output voltage Vs of the CCD device 10 is represented by an assembly of a number of fields. Here, the output voltage of the n-th field ($n \leq N$) will be designated as Vn(t). As the output voltage Vn(t) has the fundamental frequency fo, the function Vn(t) can be expanded into the following well known orthogonal expansion:

$$Vna(t) = \sum_k a_{nk} \phi_k(fo,t) \tag{1}$$

In Eq.(1), it should be noted that the higher order term of this equation represents the noise components caused by the reset noise or the 1/f noise described previously. Only the first order term $$Vn(t) = a_{n1}\phi(f0, t) \tag{2}$$

correctly represents the net effect of the electric charges formed by the CCD device in accordance to the detection of information. As the amplitude of the voltage Vn(t) of Eq.(1) is generally represented by the norm of the vector defined by the coefficients of expansion in Eq.(1), the amplitude of the voltage Vn(t) is given as $$Vamp(n) = |a_{n1}| \tag{3}$$

where the symbol $| \ldots |$ represents the operator for taking the norm.

As described heretofore, the signal amplitude of the output signal of the active elements in the CCD devices can be reproduced by obtaining the first order coefficient $a_{n1}$ of the expansion of Eq.(1) and applying the operation of Eq.(3) thereto. Thereby, the noise components including the frequency components lower than the frequency fo as well as the d.c. component are eliminated.

Next, the process for obtaining the first order coefficient $a_{n1}$ from the input signal Vna(t) will be described. In principle, this process utilizes the nature of the inner product of the orthogonal function used in Eq.(1) or Eq.(2):

$$\int_t^{t+T} dt \cdot \phi n(f,t) \cdot \phi m(f,t) = C \cdot \delta_{mn} \tag{4}$$

where T=1/f, C=constant, and $\delta_{mn}$ is the Kronecker's delta.

Applying Eq.(4) to the expansion of Eq.(2), the following Eq.(5) is obtained:

$$C(n) = \int_t^{t+T} dt \cdot Vn(t)\phi_1(fo,t). \tag{5}$$

Thus, by substituting Eq.(2) into Eq.(5), one obtains the relation:

$$C(n) = a_{n1} \tag{6}$$

where the relation of Eq.(4) is used.

From Eq.(6), it will be understood that the signal amplitude Vamp(n) of the desired CCD output is given for the picture element n as:

$$Vamp(n) = \lceil C(n) \rceil \tag{7}$$

The foregoing Eq.(2) and Eq.(5) can be written in the form of summation instead of integral by employing the discrete series for the parameter t as:

$$Vn(i\Delta t) = \sum_k a_{nk} \cdot \phi_k(fo,i\Delta t), \tag{8}$$

and $$C(n) = \sum_{i=0}^{m-1} Vn(i\Delta t) \cdot \phi_1(fo,i\Delta t), \tag{9}$$

where $M\Delta t = T = 1/fo$.

Eqs.(8) and (9) indicates the process of obtaining the value of Vamp(n) by the steps of sampling the input signal Vn for each picture element n with a sampling interval $\Delta$ for M times, and calculating the parameter C(n) according to Eq.(9). Further, the value Vamp(n) is calculated by the norm operation of Eq.(7). As already explained, this value Vamp(n) represents the desired, net output of the CCD device for the picture element n.

As for the base of expansion, any known orthogonal function system may be used. The orthogonal function suitable for the present purpose in view of the waveform of the output of CCD device is the trigonal function of the Walsh function. However, the orthogonal function employed for the present purpose is not limited to these but may be any other suitable or convenient function, including real and complex functions.

In the case when the trigonal function is used for the orthogonal function $\phi n(t)$, the orthogonal function $\phi n(t)$ is represented as:

$$\phi n(t) = exp(j \cdot 2\pi n \cdot fo \cdot t) \tag{10}$$

The representation of Eqs.(1)–(9) for the case when the trigonal function is used for the base of expansion becomes as follows. Only the equations are cited and the explanation thereof will be omitted.

$$Vn(t) = a_{n0}/2 + \sum_k a_{nk}\cos 2\pi fo \cdot t + \sum_k b_{nk}\sin 2\pi fo \cdot t \tag{1'}$$

-continued $$Vna(t) = a_{n1}\cos 2\pi fo \cdot t + b_{n1}\sin 2\pi fo \cdot t \quad (2')$$

$$Vamp(n) = (a_{n1}^2 + b_{n1}^2)^{1/2} \quad (3')$$

$$\int_t^{t+T} dt \cdot \cos 2mft \cdot \cos 2nft + \quad (4a')$$

$$\int_t^{t+T} dt \cdot \sin 2mft \cdot \sin 2nft = 2/T \cdot \delta_{mn}$$

$$\int_t^{t+T} dt \cdot \cos 2\pi mft \cdot \sin 2\pi nft = 0 \quad (4b')$$

$$C(n) = \int_t^{t+T} dt \cdot Vn(t)\cos 2\pi fo \cdot t \quad (5a')$$

$$S(n) = \int_t^{t+T} dt \cdot Vn(t)\sin 2\pi fo \cdot t \quad (5b')$$

$$C(n) = a_{n1} \quad (6a')$$

$$S(n) = b_{n1} \quad (6b')$$

$$Vamp(n) = (C(n)^2 + S(n)^2)^{1/2} \quad (7')$$

$$Vn(i_\Delta t) = a_{no}/2 + \sum_k a_{nk}\cos 2\pi k \cdot fo \cdot i \cdot \Delta t + \quad (8')$$

$$\sum_k b_{nk}\sin 2\pi k \cdot fo \cdot i \cdot \Delta t$$

$$C(n) = \sum_{i=1}^{m-1} Vn(i \cdot \Delta t)\cos 2\pi fo \cdot i \cdot \Delta t \quad (9a')$$

$$S(n) = \sum_{i=1}^{m-1} Vn(i \cdot \Delta t)\sin 2\pi fo \cdot i \cdot \Delta t \quad (9b')$$

where Eq.(1') corresponds to Eq.(1), Eq.(2') corresponds to Eq.(2), Eq.(3') corresponds to Eq.(3), Eqs.(4a') and (4b') corresponds to Eq.(4), Eqs.(5a') and (5b') corresponds to Eq.(5), Eqs.(6a') and (6b') corresponds to Eq.(6), Eq.(7') corresponds to Eq.(7), Eq.(8') corresponds to Eq.(8), and Eqs.(9a') and (9b') corresponds to Eq.(9).

Figure 5:
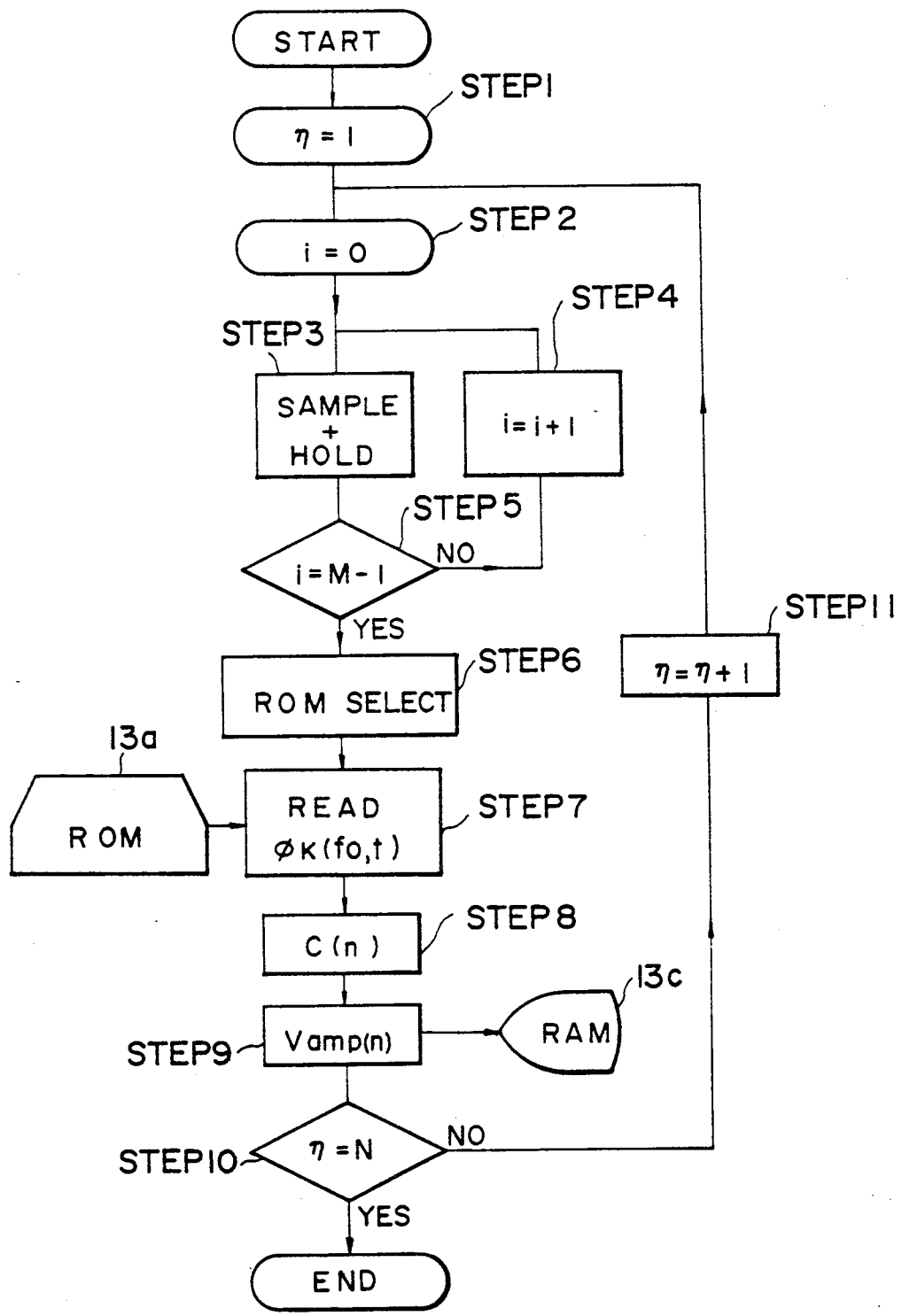
FIG. 5 is a flowchart showing the operation of the detector of the first embodiment.

Next, the operation of the system shown in FIG. 3, particularly of the processing unit 13, based upon the foregoing principle will be described with reference to the flowchart of FIG. 5.

In a step 1 made prior to the sampling of the output signal Vs by the sample and hold circuit 11, the parameter n indicating the picture element under processing is set to 1. Thereby, the output of the CCD element corresponding to the first picture element is processed.

Next, in a step 2, the value of a temporary parameter i is cleared, and sampling of the output signal Vs is made in a step 3 by the sample and hold circuit 11 repeatedly while each time increasing the value of i in a step 4 by an increment 1, until it is discriminated in a step 5 that M data points are obtained for the current picture element.

Next, in a step 6, a selection of the memory field in the ROM 13a is made. For example, the memory field storing the trigonal functions or the memory field storing the Walsh function is specified in this step. The selection is made based upon the orthogonal function that is suited for expansion into the orthogonal series.

Next, in a step 7, the orthogonal function set in the specified memory field is read out. Further, in a step 8, the parameter C(n) in Eq.(9) or Eqs.(9a') and (9b') is made according to the equation described therein. It should be noted that the value of the orthogonal function $\phi k(fo, t)$ is stored in the form of look-up table and the calculation according to Eq.(6) or Eqs.(6a') and (6b') is achieved easily.

Further, in a step 9, the amplitude Vamp is calculated according to Eq.(7) or (7') and the obtained amplitude data is stored in the RAM 13c that cooperates with the processing unit 13. When the step 9 is completed, a discrimination is made in a step 10 whether the value n is equal to N or not, and if not, the value n is increased by 1 in a step 11 and the steps 2 through 10 are repeated until it is discriminated in the step 10 that the value n is equal to N.

Next, the elimination of the noise from the output of the CCD device 10 will be described.

Figure 6:
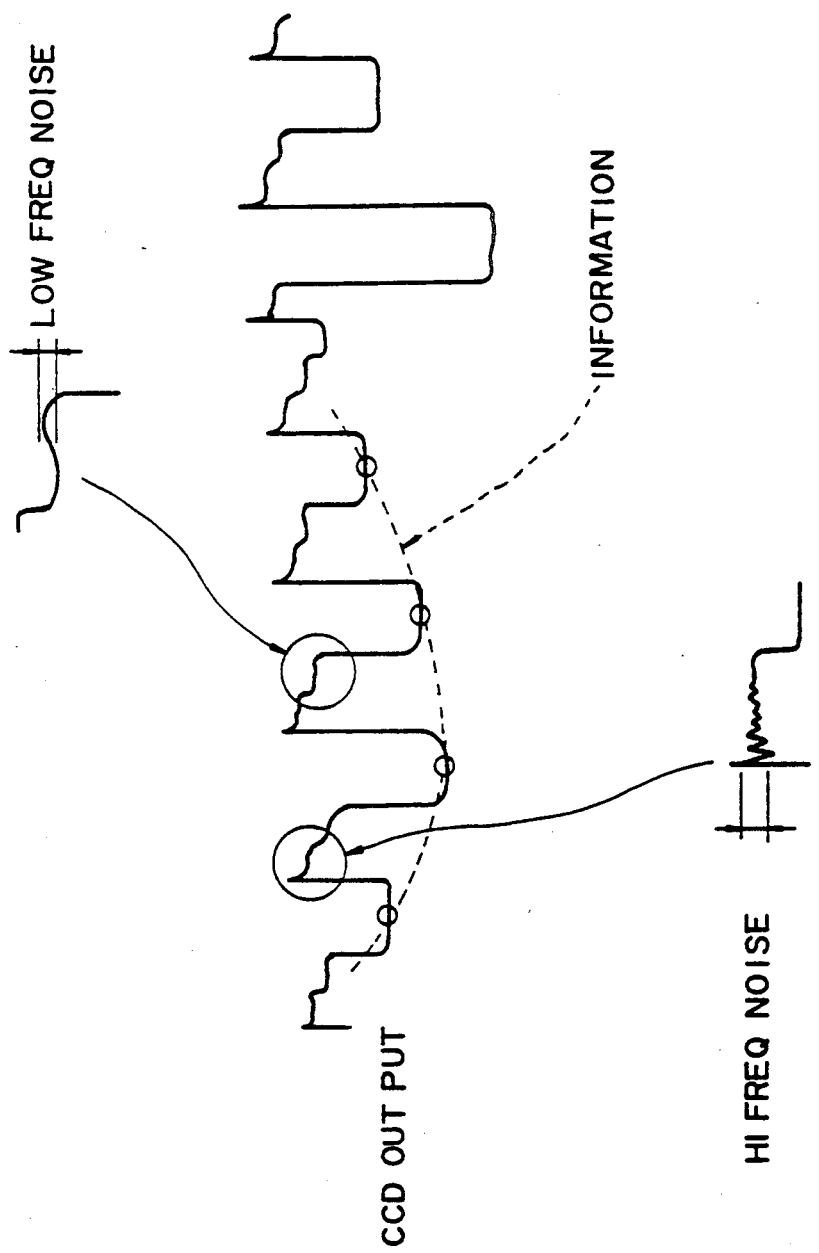
FIG. 6 is a waveform diagram showing the elimination of high frequency and low frequency noise in the first embodiment.

FIG. 6 shows an example of the output signal Vs(t) of the CCD output signal. For the sake of simplicity, the illustration of the transfer clock and the reset clock is omitted. Referring to FIG. 6, the broken curve designated as as "INFORMATION" shows a low frequency signal component that is the real output of the CCD device and representing the information detected by the CCD device. It should be noted that the curve INFORMATION changes gradually from one picture element to another picture element and there exists a cross-correlation between the picture elements. In the output signal Vs of the CCD device 10 carrying the information, high frequency noise components and low frequency noise components are superposed on the output signal. It should be noted that these noise components do not have the cross-correlation between picture elements.

Thus, the present invention is extremely useful for improving the signal-to-noise ratio of output of the CCD device by selectively removing the high frequency and low frequency noise components that have no cross-correlation between different picture elements while leaving the signal component that has the cross correlation between the picture elements substantially unaffected.

Next, a second embodiment of the present invention will be described with reference to FIG. 7. In the drawing, those parts that have been already described are given identical reference numerals and the description thereof will be omitted.

Referring to FIG. 7, the detection circuit includes a low pass filter 15 between the CCD device 10 and the sample and hold circuit 11. The low pass filter 15 has a frequency characteristic shown in FIG. 8 and cuts off the frequency component substantially higher than the frequency fo. Thereby, the undesirable aliasing effect, that is caused due to the extremely high frequency components being involved in the output signal of the CCD device, is eliminated. It should be noted that such a high frequency components are formed in response to the sharp rising and trailing edges of the CCD output signal and causes a problem that Eq.(1) or Eq.(8) does not hold with sufficient accuracy, particularly in the vicinity of the leading and trailing edges of the CCD output signals. In the present embodiment, the high frequency components higher in frequency than the frequency fo are substantially eliminated by the low pass filter 15 and the problem of the aliasing is effectively eliminated. It should be noted that such filtering of the high frequency components does not cause problem of losing information obtained by the CCD device, as such information does not have the frequency higher than fo.

FIGS. 9(A)-9(C) show the elimination of the noise from the output of the CCD device achieved by the present embodiment, wherein the curve shown in FIG. 9(C) in the continuous line represents the output of the CCD device thus processed by the low pass filter 15. As can be seen from FIG. 9(C), the noise components are eliminated from the signal in each picture element, while preserving the information represented by the broken line.

Figure 10:
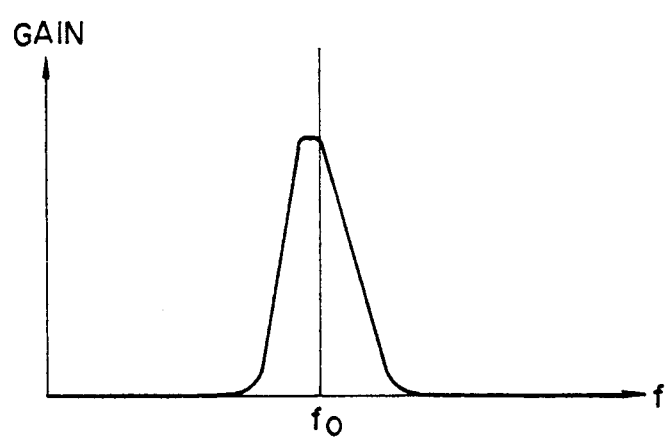
FIG. 10 is a diagram showing another characteristic of the filter used in the second embodiment.

It should be noted that the low pass filter 15 used in the second embodiment may be a band pass filter that has a central frequency substantially coincident to or slightly offset to the low frequency side with respect to the transfer clock frequency fo as shown in FIG. 10.

In any embodiment of the present invention, the foregoing processing in the processing unit 13 is made digitally, and the output data produced is converted into an analog signal by the digital-to-analog converter 14.

In the present system, any processing circuit that precedes or follows the processing circuit 13 of the present invention does not need to have the extremely stringent characteristic that is requested to process the output pulses of the CCD device directly. In other words, as a result of use of the present invention, the designing of the circuits in the following stages is significantly simplified.

Further, the present invention is not limited to the embodiments described heretofore, but various variations and modifications may be made without departing from the scope of the invention.

What is claimed is:

1. A detection system for detecting information using a charge-coupled device, comprising:
    a charge-coupled device for detecting information, said charge-coupled device being supplied with a clock pulse having a predetermined frequency and producing an output signal pulse including a signal component that corresponds to the information in response to each clock pulse;
    memory means for storing a set of orthogonal functions each having a frequency that is equal to or a multiple of the frequency of the clock pulse, said orthogonal functions being chosen such that any orthogonal function in the set produces a zero inner product with other orthogonal function in the set; and
    processing means supplied with the output signal pulse from the charge-coupled device sequentially in response to the clock pulse and further for reading out the orthogonal functions stored in the memory means, said processing means expanding each output signal pulse of the charge-coupled device into an orthogonal series using the orthogonal functions as a base of expansion, said orthogonal series involving a plurality of terms each characterized by a coefficient of expansion and a corresponding orthogonal function serving for the base;
    wherein said processing means extracts a term in the orthogonal series that corresponds to the signal component representing the information detected by the charge-coupled device as an output signal.

2. A detection system as claimed in claim 1 in which said orthogonal series comprises a Fourier series using trigonal functions for the orthogonal function.

3. A detection system as claimed in claim 1 in which said orthogonal functions comprise the Walsh functions.

4. A detection system as claimed in claim 1 in which said processing means extracts the term corresponding to the detected information by extracting the first order term from the orthogonal series, and produces the output signal of the processing means as a norm of the coefficient of expansion for the first order term.

5. A detection system as claimed in claim 1 further comprising low pass filter means having a characteristic that cuts off input signals supplied thereto for those frequency components that have a frequency higher than the frequency of the clock pulse, said low pass filter means being provided such that the low pass filter means is supplied with the output signal pulse of the charge coupled device and supplying an output signal, from which signal components having the frequency higher than the frequency of the clock pulse are substantially removed, to the processing means.

6. A detection system as claimed in claim 1 further comprising bandpass filter means having a characteristic that cuts off input signals supplied thereto for those components that have a frequency higher and lower than the frequency of the clock pulse, said bandpass filter means being provided such that the bandpass filter means is supplied with the output signal pulse of the charge coupled device and supplying an output signal, from which signal components having the frequency higher than and lower than the frequency of the clock pulse are substantially removed, to the processing means.

7. A detection system as claimed in claim 1 further comprising analog-to-digital conversion means for converting an analog input signal to a digital output signal, such that the analog-to-digital conversion means is supplied with the output signal pulse of the charge coupled device and supplies the digital output signal to the processing means.

8. A detection system as claimed in claim 1 in which said memory means comprises a plurality of memory fields each storing a set of orthogonal functions that are different from those stored in other memory fields, and said processing unit selectively reads out the orthogonal function from a designated memory field.

9. A method for eliminating noise from an output signal pulse produced sequentially by a charge coupled device in response to a clock pulse having a predetermined clock frequency, said output signal pulse representing information that is detected by the charge coupled device, comprising the steps of:
    filtering the output signal pulse to form a filtered output signal pulse such that signal components having a frequency that exceeds the clock frequency are substantially eliminated from the filtered output signal pulse;
    expanding said filtered output signal pulse obtained in said step of filtering the output signal pulse into an orthogonal series having a plurality of terms therein, each term comprising a coefficient of expansion;
    extracting a term that represents the information signal from said plurality of terms that are obtained in said step of expanding the filtered output signal pulse; and
    calculating as an output signal pulse a norm from the coefficient of expansion in the extracted term obtained in said step of extracting, said output signal pulse representing the information detected by the charge coupled device and from which the noise is eliminated.

10. A method as claimed in claim 9 in which said step of filtering is made to eliminate signal components that are substantially lower than the clock frequency from the filtered output signal pulse, leaving signal components that have a frequency substantially coincident to the clock frequency.

* * * * *